United States Patent [19]
Ellis

[11] 3,824,406
[45] July 16, 1974

[54] PHASE RESPONSIVE CONTROL CIRCUIT
[75] Inventor: Charles W. Ellis, Lorain, Ohio
[73] Assignee: Lorain Products Corporation, Lorain, Ohio
[22] Filed: Jan. 29, 1973
[21] Appl. No.: 327,292

Related U.S. Application Data
[62] Division of Ser. No. 152,770, June 14, 1971, Pat. No. 3,723,888.

[52] U.S. Cl. .............................................. 307/87
[51] Int. Cl. .............................................. H03k 5/20
[58] Field of Search .................................... 307/87

[56] References Cited
UNITED STATES PATENTS
2,929,941   3/1960   Bobo ..................................... 307/87
3,588,710   6/1971   Masters ................................ 328/155

Primary Examiner—James R. Scott
Assistant Examiner—M. Ginsburg

[57] ABSTRACT

A circuit for establishing and controlling a synchronous relationship between the voltages of two independently energized a-c sources. Two a-c voltages are applied in switching control relationship to respective inputs of a phase comparator circuit. The comparator circuit generates a pulse train having a duty cycle which is a substantially linear function of the phase angle between the voltages of the two a-c sources. A reference pulse train having a fixed duty cycle is subtracted from the variable duty cycle pulse train to establish a signal voltage that varies in accordance with the magnitude and sign of the phase angle between the voltages of the two a-c sources. When the frequency of one a-c source is within acceptable frequency limits, the above signal voltage is allowed to vary the frequency of the other a-c source, as required, to maintain a synchronous relationship between the voltages of the two a-c sources. When, however, the frequency of one a-c source varies outside of acceptable frequency limits, the above signal voltage is prevented from varying the frequency of the other a-c source which then operates at a fixed, predetermined frequency.

3 Claims, 14 Drawing Figures

PHASE RESPONSIVE CONTROL CIRCUIT

This is a division of application Ser. No. 152,770 filed June 14, 1971, which application issued as U.S. Pat. No. 3,723,888 on Mar. 27, 1973.

BACKGROUND OF THE INVENTION

The present invention relates to sensing and control circuits and is directed more particularly to sensing and control circuits which vary the frequency of a one a-c source, as required, to bring the voltage produced thereby into synchronism with the voltage of another, independently energized a-c source.

Under circumstances where the voltages of two independently energized a-c sources must be kept in synchronism, it is necessary to provide circuitry which can vary the frequency of one source as required to follow variations in the frequency of the other. In an emergency power system, for example, an inverter may be required to operate in synchronism with the commercial a-c line to assure a smooth transfer of a protected load from the inverter to the line or vice-versa in the event of inverter or a-c line power failure.

To achieve the desired synchronous operation, an emergency power system of the above type should include a frequency control circuit for varying the operative frequency of the inverter and a sensing circuit for controlling the frequency control circuit in accordance with the phase angle between the inverter and line voltages. The sensing circuit causes the frequency control circuit to vary the operative frequency of the inverter, as required, to reduce the difference between the then existing phase relationship between the inverter and line voltages and the then desired phase relationship therebetween. Since the inverter and line voltages cannot be kept in a fixed phase relationship unless they have the same frequency, this phase angle control assures both the desired frequency match and the desired phase match.

In addition, it is desirable to provide circuitry which will terminate the above described synchronous relationship if the frequency of the a-c line varies outside of acceptable frequency limits. This is because a load that is energized by an inverter will not be isolated from excessive line frequency variations if the inverter is allowed to conform its own frequency to that of an a-c line which has an unacceptable frequency. Finally, it is desirable to provide circuitry which will re-establish the synchronous relationship between the inverter and the a-c line after the latter is restored to an acceptable condition. Thus, a complete emergency power system includes synchronism control circuitry which can cause the inverter to operate in synchronism with the a-c line or which can cause the inverter to operate independently of the a-c line, depending upon which condition is more beneficial to the protected load.

A frequency control circuit of the above character is described in the copending U.S. Pat. application of C. Ellis, Ser. No. 152,642, entitled Variable Frequency Pulse Generating Circuit, the latter application having issued as U.S. Pat. No. 3,736,516 on May 29, 1973. A sensing circuit and a synchronism control circuit having the above described properties are described herein.

SUMMARY OF THE INVENTION

It is an object of the invention to provide improved phase responsive sensing and control circuitry.

Another object of the invention is to provide circuitry for comparing the voltage of a first a-c source with the voltage of a second, independently energized a-c source and for providing a signal voltage which can be utilized to vary the frequency of the first source, as required, to bring its voltage into synchronism with that of the second source.

Another object of the invention is to provide circuitry for generating a signal voltage having a magnitude and sign that is dependent upon the magnitude and sign of the phase angle between two a-c voltages.

Still another object of the invention is to provide a sensing circuit having an output voltage which varies substantially linearly as the phase angle between two a-c sources varies from $-180°$ to $+180°$.

Yet another object of the invention is to provide an improved sensing circuit wherein the duty cycle of a pulse train is varied in accordance with predetermined transitions of two other pulse trains, the transitions of such other pulse trains being controlled by the a-c voltages which are being compared.

A further object of the invention is to provide an improved sensing circuit wherein a reference pulse train having a substantially fixed duty cycle is subtracted from a variable duty cycle pulse train to establish a voltage which varies in accordance with the deviation of the variable duty cycle pulse train from the reference pulse train.

It is still another object of the invention to provide a sensing circuit of the above character including circuitry for providing a smoothly varying signal voltage having a magnitude and sign which varies in accordance with the difference between the variable duty cycle pulse train and the reference pulse train.

Another object of the invention is to provide synchronism control circuitry which will terminate the synchronous relationship between the first and second a-c sources when the frequency of the second source varies outside of acceptable frequency limits and which will re-establish the above synchronous relationship after the second source is restored to an acceptable condition.

Still another object of the invention is to provide synchronism control circuitry which will terminate the synchronous relationship between the first and second a-c sources when one or more of a plurality of circuit quantities being sensed indicate that the frequency of the second a-c source has varied outside of acceptable frequency limits, this termination being accomplished within a time sufficient to prevent the first a-c source from following the second a-c source outside of acceptable limits.

Yet another object of the invention is to provide synchronism control circuitry which will delay the re-establishment of a synchronous relationship between the first and second a-c sources until after the second source has returned to an acceptable condition and maintained that condition for a predetermined time.

A further object of the invention is to provide synchronism control circuitry which will terminate the synchronous control relationship between the first and second sources if the voltage of either source under-goes two consecutive positive going polarity reversals or zero crossings without an intervening positive going polarity reversal or zero crossing in the voltage of the other.

A still further object of the invention is to provide synchronism control circuitry which will terminate the synchronous control relationship between the first and second sources if the phase angle between the voltage of the two a-c sources exceeds predetermined angular limits.

Generally, it is an object of the invention to provide phase responsive sensing and control circuitry for producing an analog control voltage which can be utilized to establish a synchronous relationship between the voltage of two a-c sources and for producing a digital control voltage which can be utilized to promote or to inhibit the implementation of the above synchronous control relationship.

DESCRIPTION OF THE INVENTION

Figure 1:
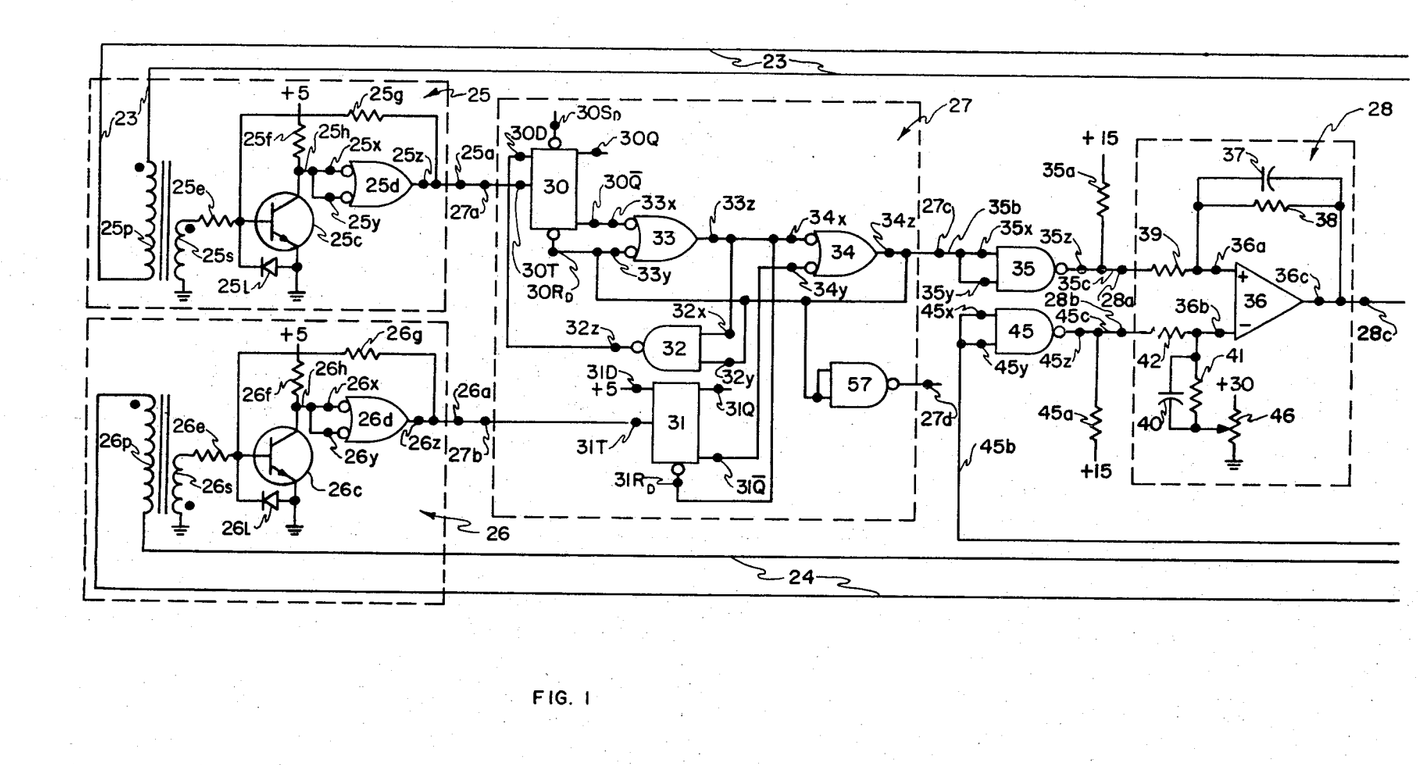
FIGS. 1 and 2 comprise a combined logic, schematic and block diagram of connected sections of one circuit embodying the invention.
Figure 2:
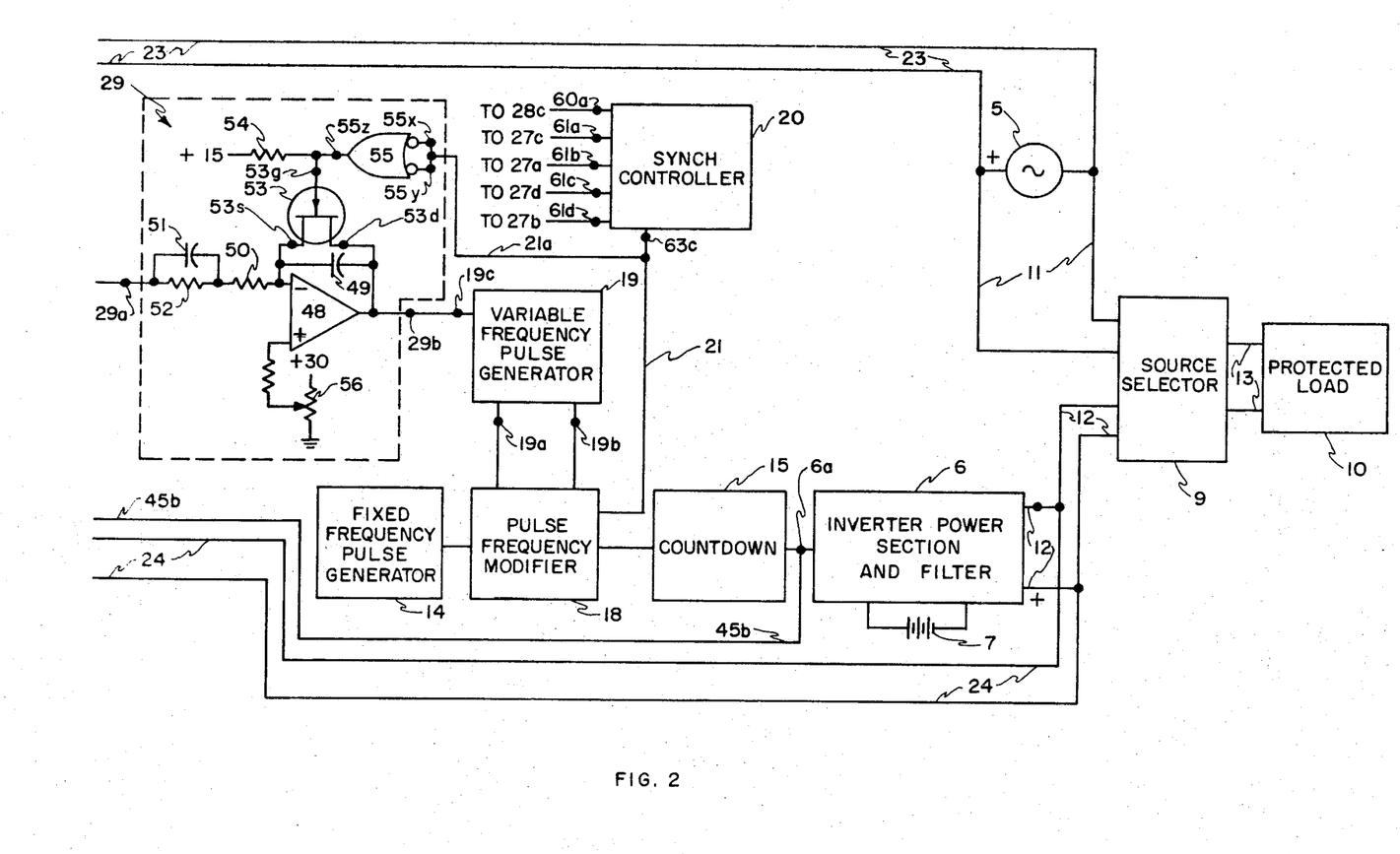

Referring to FIGS. 1 and 2, there is shown an exemplary emergency power system embodying the invention. In the present embodiment, the emergency power system includes a first source of a-c power which may comprise an inverter 6 energized from a battery 7 and a second, independently energized a-c source 5 which may be the commercial a-c line. The emergency power system also includes a source selector circuit 9 which connects a-c sources 5 and 6 in power maintaining relationship to a protected load 10 through conductor pairs 11, 12 and 13.

Selector circuit 9 may, for example, be arranged to energize load 10 from inverter 6 when the latter operates normally and to transfer load 10 to a-c line 11 when the inverter fails. In order to assure that this transfer is smooth, the voltages of a-c sources 5 and 6 should be in synchronism, that is, matched both in frequency and in phase, at the time of the transfer. As will be seen presently, a circuit constructed in accordance with the invention is adapted to assure that this synchronized condition will exist.

Referring to FIG. 2, there is shown a fixed frequency pulse generator 14 (which may, for example, comprise a crystal oscillator) for initiating a series of pulses at the switching control input 6a of inverter 6. These pulses control the switching frequency of inverter 6 and, thereby, the frequency of the inverter output voltage. Because crystal oscillators normally operate at frequencies in excess of those at which presently available inverters can commutate, such control pulses will normally be provided to inverter 6 through any suitable countdown or frequency dividing circuit 15. The latter circuit may, for example, include a chain of flip-flops for converting a pulse train having a frequency in the megahertz range to a pulse train having a 50 percent duty cycle and a frequency suitable for use in controlling the commutation of an inverter operating at 60 hertz.

In order to keep the voltage of inverter 6 in synchronism with the voltage of a-c line 11, pulse generator circuit 14 controls the frequency of the pulse train at inverter output 6a through a pulse frequency modifying circuit 18. The latter circuit adds to or subtracts from the number of pulses which generator 14 applies to countdown circuit 15, as required, to establish and maintain a synchronous relationship between the inverter and the line. This addition or subtraction is accomplished in accordance with the number of pulses which appear at outputs 19a and 19b of a variable frequency pulse generator 19. The number of pulses at outputs 19a and 19b is, in turn, controlled in accordance with the control voltage which the circuitry of the invention applies to the input 19c of pulse generator 19.

When the frequency of the a-c line voltage is within acceptable frequency limits, the circuitry of the invention compares the inverter ouput voltage on conductor pair 12 with the a-c line voltage on conductor pair 11 and produces a control voltage that varies the inverter frequency, as required, to establish synchronism therebetween. When, However, the voltage on conductor pair 11 fails or otherwise varies outside of acceptable frequency limits, a synchronism control circuit 20 suppresses the adding and subtracting activity of pulse frequency modifying circuit 18, through a conductor 21 to interrupt the synchronous relationship between the inverter and the line voltages. It will be understood that when inverter 6 energizes load 10 after the synchronizing activity of network 18 has been suppressed, the voltage applied to load 10 will have a frequency determined by fixed frequency pulse generator 14.

The above described frequency modifying circuit and variable frequency pulse generator are described, in detail, in the above identified U.S. Pat. of C. Ellis, No. 3,736,516.

The circuit of the present embodiment utilizes TTL logic wherein the high state is represented by a positive voltage and the low state is represented by ground or zero volts. When a point is said to be "high", it is meant that that point is greater than or equal to 2.7 volts positive from ground. Similarly, when a point is said to be "low", it is meant that that point is less than or equal to .4 volts positive from ground. Several well known types of logic devices are used to implement the present invention.

An example of a first type of logic device used herein is the gate 33 of FIG. 1. Gate 33 has first and second inputs 33x and 33y and an output 33z. The output of this gate is high only if one or more of its inputs are low. Another logic device is the gate 45 of FIG. 1. The output 45z of this gate is low only if both inputs 45x and 45y thereof are high.

Figure 5:
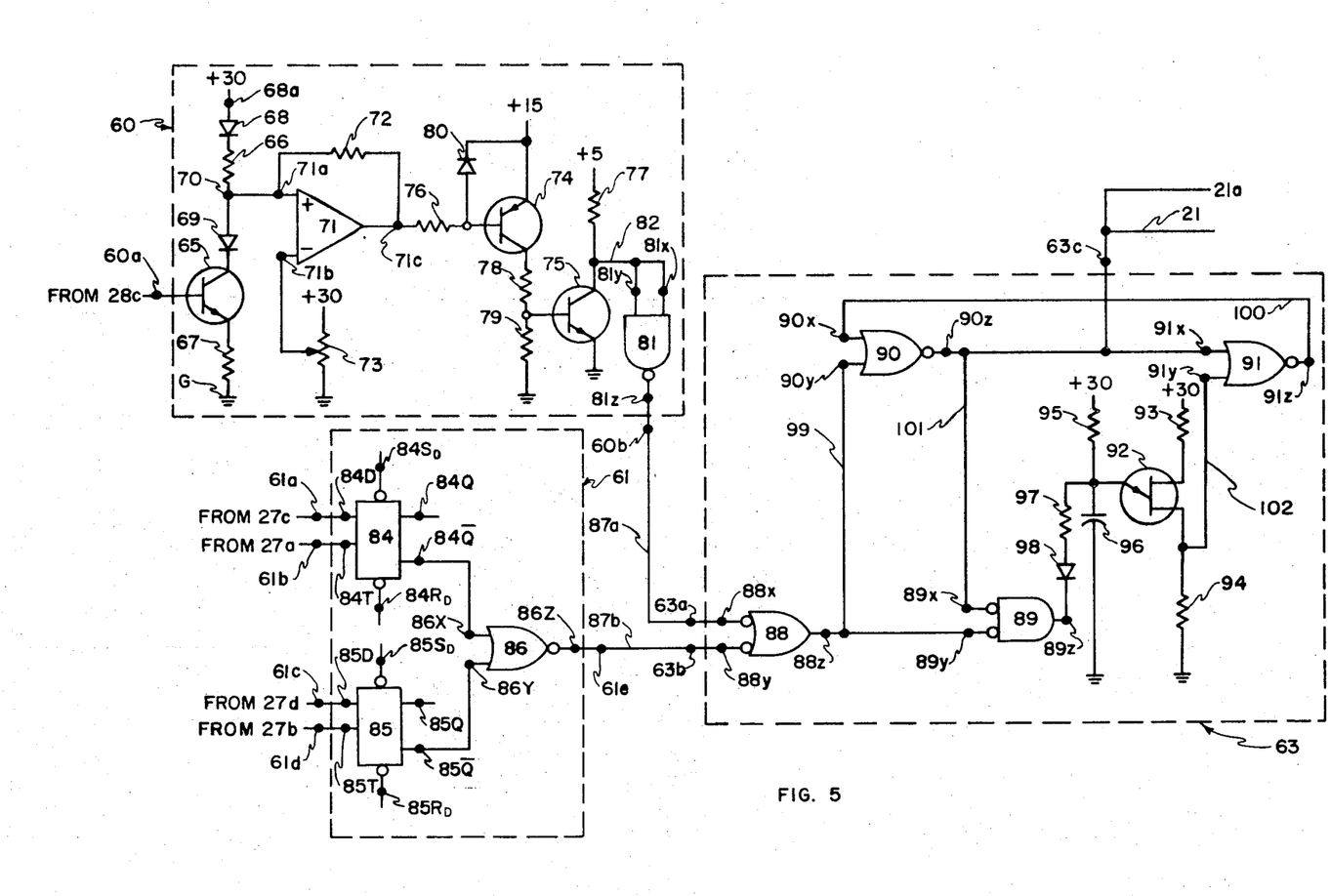
FIG. 5 is a combined logic and schematic diagram of one of the circuits shown in block form in FIG. 2, FIGS. 6a, 6b and 6c and FIG. 7 are timing diagrams showing the voltages appearing within the circuitry of FIG. 5 under various operating conditions.

A second type of logic device used herein is the gate 89 of FIG. 5. The output 89z of this gate is high only if both inputs 89x and 89y thereof are low. Another logic device is the gate 86 of FIG. 5. The output 86z of this gate is low if one or more of the inputs 86x and 86y thereof are high.

A third type of logic device used herein is the "D" or delay type flip-flop 30 of FIG. 1. Flip-flop 30 has a signal input 30D, a timing or clock input 30T, an unclocked reset input $30R_D$, an unlocked set input $30S_D$ and first and second outputs 30Q and $30\overline{Q}$ which are normally in opposite or complementary states. When a low appears at input $30R_D$, output $30\overline{Q}$ goes high thus resetting the flip-flop. Similarly, when a low appears at input $30S_D$, output 30Q goes high thus resetting the flip-flop. In addition, and subject to the states of inputs $30R_D$ and $30S_D$, a low-to-high transition in the voltage at input 30T will cause output 30Q to assume the same state as input 30D.

As described previously, the ability of source selector 9 to substitute power from one a-c source for power from the other without appreciable disturbance to protected load 10 requires that the output voltage of the one a-c source be kept in synchronism with the voltage of the other. To the end that this may be accomplished, the circuitry of FIGS. 1 and 2 is disposed in voltage sensing relationship to conductor pairs 11 and 12, through sensing leads 23 and 24, respectively, and is disposed in frequency control relationship to input 19c of variable frequency pulse generator 19.

In the present embodiment, the circuitry of FIGS. 1 and 2 includes controllable pulse generating circuits 25 and 26 which produce respective pulse trains in accordance with the a-c voltages on conductor pairs 11 and 12, respectively, and a comparator circuit 27 for generating a pulse train the duty cycle of which varies in accordance with the phase angle between the above a-c voltages, as manifested by the phase angle between the pulse trains produced by pulse generators 25 and 26. The circuitry of FIGS. 1 and 2 also includes a translator 28 for converting the output voltage of comparator circuit 27 into a smoothly varying signal voltage the magnitude and sign of which are indicative of the phase angle between the sensed a-c voltages.

The Controllable Pulse Generators

In order that pulse generating circuit 25 may establish a pulse train in accordance with the sinusoidal a-c voltage appearing on sensing leads 23, there is provided a coupling transformer having a primary winding 25p and a secondary winding 25s and a switching network including an NPN transistor 25c and a gate 25d. The latter network causes the voltage at controllable pulse generator output 25a to switch from one state to another as the voltage on conductor pair 23 varies sinusoidally from one half-cycle to the next. As a result, the output voltage of pulse generator 25 is the pulse-train equivalent of the sinusoidal voltage appearing on sensing leads 23.

When a-c source 5 renders the upper end of secondary winding 25s positive from the grounded end thereof, current flows through winding 25s, resistor 25e and the base-emitter control circuit of transistor 25c to ground. This control current will initiate a flow of current, through a resistor 25f and the collector-emitter power circuit of transistor 25c, which will lower the voltage that appears at the inputs 25x and 25y of gate 25d. When the a-c input voltage attains a positive value sufficient to lower the voltage at the inputs of gate 25d to the switching or threshold value thereof, the output of gate 25d will switch from its low to its high state.

Later in the a-c voltage cycle, when the voltage across secondary winding 25s reverses in polarity, transistor 25c will turn off. Under these conditions, the voltage at gate inputs 25x and 25y will rise causing gate output 25z to return to its low state. At this time the current in secondary winding 25s is bypassed around the base-emitter junction of transistor 25c through a diode 25i.

From the foregoing, it will be seen that output 25a of pulse generating circuit 25 will change states twice during each cycle of the a-c voltage from a-c source 5. Because a resistor 25g, connected between gate output 25z and the base of transistor 25c, introduces a degree of positive feedback or regeneration into the response of network 25, these changes in state occur rapidly resulting in an output waveform comprising a plurality of pulses each of which has a rise and fall time which is short in relation to the rise and fall times of the sensed a-c voltage. Thus, the voltage appearing at the output 25a of pulse generating circuit 25 is a pulse train, the transitions of which are controlled in accordance with the a-c voltage appearing on sensing leads 23.

Figure 4A:
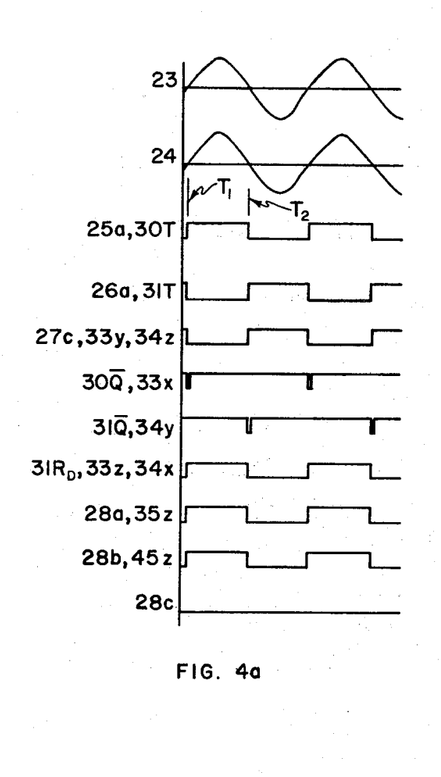
FIGS. 4a, 4b and 4c are timing diagrams showing the voltages appearing within the circuit of FIGS. 1 and 2 under various operating conditions.

Controllable pulse generator 26 is similar to pulse generator 25 and it will be understood that remarks made with reference to the latter are equally applicable to the former. Because the end of secondary winding 25s which has a polraity dot is connected to transistors 25c while the end of winding 26s which does not have a polarity dot is connected to transistor 26c, however, the pulse trains at outputs 25a and 26a will be 180° out of phase when the voltages on sensing leads 23 and 24 are in phase. This phase relationship is shown in FIG. 4a. It will be understood that the term phase angle, as used herein, is the angle from a positive going zero crossing of the a-c line voltage to the nearest positive going zero crossing of the inverter voltage.

The Comparator

Figure 3A:
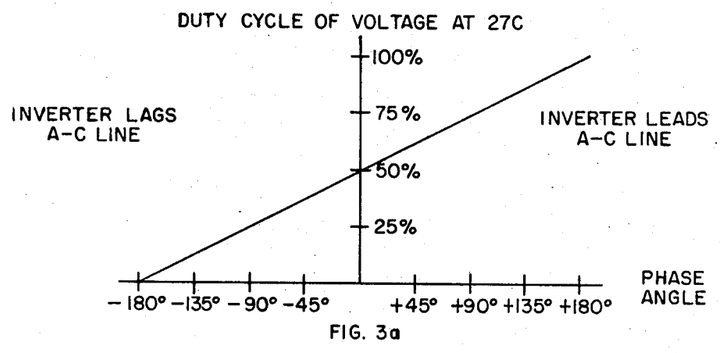
FIGS. 3a, 3b and 3c are graphs showing the response of the circuit of the invention as a function of the phase angle between the a-c voltages being sensed.

To the end that the a-c voltages on sensing leads 23 and 24 may be compared to determine the phase angle therebetween, the inputs 27a and 27b of a phase comparator circuit 27 are connected to pulse generator outputs 25a and 26a, respectively. As will be seen presently, comparator 27 establishes a pulse train at output 27c thereof which has a duty cycle (as measured by the percentage of the pulse train period which output 27c spends in its high state) that is a linear function of the phase angle between the pulse trains which appear at comparator input 27a and 27b. In the present embodiment, the duty cycle of this pulse train is arranged to vary substantially linearly between 0 and 100 percent as the phase angle between the pulse trains at pulse generator outputs 25a and 26a varies between −180° and +180°. This relationship is shown in FIG. 3a.

To the end that this may be accomplished, comparator 27 includes a first switching network including flip-flop 30 and gates 33 and 34 for driving output 27c low when there occurs a low-to-high transition in the voltage at input 27a and a second switching network including flip-flop 31 and gate 34 for driving output 27c high when there occurs a low-to-high transition in the voltage at input 27b. Thus, comparator output 27c is low between the time that a low-to-high transition occurs at 27a and the time that a low-to-high transition occurs at 27b and is high between the time that a low-to-high transition occurs at 27b and the time that a low-to-high transition occurs at 27a. Comparator 27 also includes a gate 57 for providing a pulse train at comparator output 27d which is the complement or opposite of the pulse train at comparator output 27c. The purpose of complementary output 27d will be described more fully in connection with the circuitry of FIG. 5.

The operation of comparator 27 will now be described. Assuming that the inverter output voltage appearing on sensing leads 24 is in phase with the a-c line voltage appearing on sensing leads 23, the pulse train appearing at the output 25a of pulse generator 25 will be 180° out of phase with the pulse train appearing at the output 26a of pulse generator 26, as shown in FIG. 4a. Therein, the states of the inputs and outputs of flip-flops 30 and 31 and gates 33 and 34 may be determined by examining the voltage waveforms which bear the numbers associated with those inputs or outputs. To avoid duplication, each voltage waveform bears the numbers of all inputs and outputs at which that voltage appears. It will be understood that no attempt has been made to illustrate the infinitesimally short times required for the gates and flip-flops to change states.

At time $T_1$, when pulse generator 25 applies a low-to-high transition to comparator input 27a, flip-flop 30 is set via clock input 30T, input 30D thereof being high because it is connected to the output 32z of a gate 32 which will be discussed later. As flip-flop 30 is set, output $30\overline{Q}$ thereof goes low to render low gate input 33x. This causes output 33z to go high and, thereby, apply a high to gate input 34x and flip-flop input $31R_D$. As a result of the high appearing at gate input 34x, gate output 34z goes low and thereby applies a low to comparator output 27c, flip-flop input $30R_D$ and gate input 33y. As a result of the low which gate 34 applies to flip-flop input $30R_D$, the latter is reset ($30\overline{Q}$ high) and held in that condition so that flip-flop 30 is disabled from responding to further transitions at input 30T. The low which gate 34 applies to gate input 33y prevents gate 33 from changing states after flip-flop 30 resets. As a result of the high which gate 33 applies to flip-flop input $31R_D$, the latter is enabled, that is, rendered capable of being set by transitions at the clock input 31T thereof. Thus, a low-to-high transition at comparator input 27a causes output 27c thereof to go low.

At time $T_2$, when pulse generator 26 applies a low-to-high transition to comparator input 27b, flip-flop 31 is set via clock input 31T, input 30D thereof being high because it is connected to a +5 volt supply. As flip-flop 31 is set, output $31\overline{Q}$ thereof goes low to render low gate input 34y. The low at gate input 34y causes gate output 34z to go high and, thereby, apply a high to comparator output 27c, flip-flop input $30R_D$ and gate input 33y. As a result of the high which gate 34 applies to flip-flop input $30R_D$, the latter is enabled, that is, rendered capable of being set by transitions at the clock input 30T thereof. The high at gate input 33y causes gate output 33z to go low and, thereby, apply a low to gate input 34x and flip-flop input $31R_D$. As a result of the low which gate 33 applies to flip-flop input $31R_D$, the latter is reset and held in that condition so that flip-flop 31 is disabled from responding to further transitions at input 31T. The low which is simultaneously applied to gate input 34x prevents gate 34 from changing state after flip-flop 31 returns to its reset state. Thus, a low-to-high transition at comparator input 27b causes output 27c thereof to go high.

After the above described changes in state have occurred, the flip-flops and gates within comparator 27 will be in the same states which they were in before time $T_1$. Consequently, the above described switching activity will repeat each time there occurs a low-to-high transition at pulse generator output 25a followed by a low-to-high transition at pulse generator output 26a. Gate 32 operates as a corrector to prevent flip-flop 30 from remaining in its set state during the time that flip-flop 31 is set, if such condition should arise. This assures that flip-flops 30 and 31 cannot be trapped in configuration wherein neither flip-flop can respond to clock inputs.

Referring to FIG. 4a, which illustrates the switching activity of comparator 27 when the inverter voltage is in phase with the line voltage, it will be seen that the voltage at comparator output 27c has a 50 percent duty cycle. In contrast, FIG. 4b, which illustrates the switching activity of comparator 27 when the inverter voltage lags the line voltage, shows that the duty cycle of the voltage at output 27c is less than 50 percent; and FIG. 4c, which illustrates the switching activity of comparator 27 when the inverter voltage leads the line voltage, shows that the duty cycle of the voltage at output 27c is less than 50 percent; and FIG. 4c, which illustrates the switching activity of comparator 27 when the inverter voltage leads the line voltage, shows that the duty cycle of the voltage at output 27c is greater than 50 percent. FIG. 3a shows the relationship between phase angle and duty cycle over the entire range of phase angle variation.

To the end that the above positive and negative deviations from a 50 percent duty cycle may be utilized to vary the operative frequency of inverter 6, as required, to establish synchronism with the a-c line, the variable duty cycle pulse train appearing at comparator output 27c is converted into a smoothly varying signal voltage which is, in turn, integrated with respect to time and applied as a control voltage to variable frequency pulse generator 19. This integration assures that the control voltage applied to pulse generator 19 will change when the phase angle between the inverter and the line voltages does not have the desired value, and will remain constant, at any required value, when the phase angle therebetween does have the desired value. This integration also assures that even with small differences between the existing phase angle and the desired phase angle, the inverter frequency will change, as required, to further reduce that difference.

THE TRANSLATOR

In order to produce a smoothly varying signal voltage the magnitude and sign of which varies in accordance with the deviation of the variable duty cycle pulse train from a 50 percent duty cycle pulse train, there is provided a translator 28. In the present embodiment, translator 28 includes an operational amplifier 36 having a non-inverting input 36a, an inverting input 36b and an output 36c. This means that the voltage at amplifier output 36c will increase in accordance with increases in the voltage at non-inverting input 36a but will decrease in accordance with increases in the voltage at inverting input 36b. Thus, when voltages are applied to both amplifier inputs, as shown in FIG. 1, the voltage at the amplifier output will vary in accordance with the difference between the input voltages.

Translator 28 also includes a feedback network including a capacitor 37 and resistors 38 and 39. This feedback network causes amplifier 36 to operate as a low pass filter, that is, causes amplifier 36 to establish a voltage at output 36c thereof which reflects the average value of difference between the input voltages at inputs 36a and 36b. Because the utilization of such feedback networks is old and well-known, the manner in which this filtering characteristic is produced will not be described.

Figure 3B:
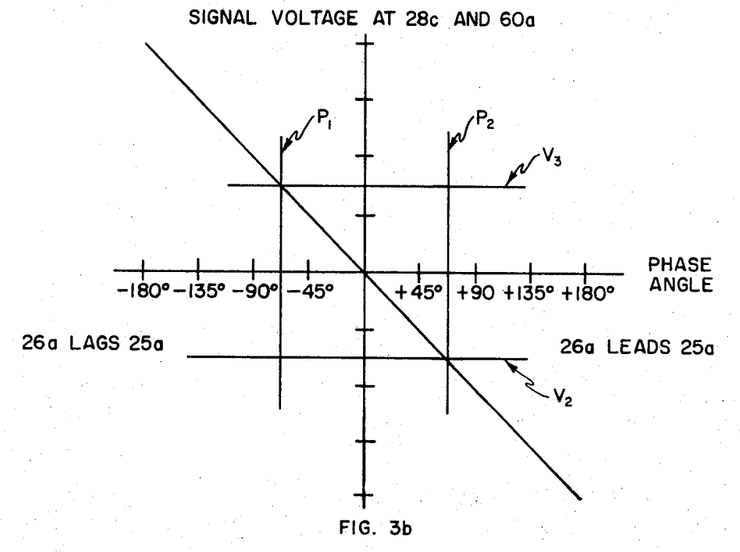

Because the variable duty cycle pulse train produced by comparator 27 is applied to translator input 28a (through a gate 35 to be discussed later), and because the 50 percent duty cycle pulse train appearing at the switching control input 6a of inverter 6 is applied to translator input 28b (through a gate 45 also to be discussed later), the signal voltage at translator output 28c changes in sign as well as magnitude as the phase angle between the inverter and line voltages varies from −180° to +180°. This change in sign is shown in FIG. 3b. The reason for the sign change is that the pulse train at translator input 28a has a variable duty cycle while the reference pulse train which is subtracted therefrom has a substantially fixed, 50 percent duty cycle. As a result, the difference between the pulse trains is negative when the variable duty cycle pulse train at 28a has a duty cycle less than 50 percent and is positive when it has a duty cycle greater than 50 percent. It will be understood that it is not necessary for the reference pulse train to bear any particular phase relationship to the variable duty cycle pulse train. If, however, such a particular phase relationship is desired, it may be established by connecting translator input 28b to the output of pulse generator 26 (through gate 45) instead of to the input of inverter 6, as shown in FIGS. 1 and 2.

Because the voltage at translator output 28c it utilized to control the frequency of inverter 6, it is desirable that the magnitude thereof be substantially unaffected by changes in the amplitude of the pulse train at translator input 28a which result from changes in the temperature of the circuitry. In the circuit of FIG. 1, the effects of thermal drift are minimized because, in the course of subtraction within translator 28, the thermal drift in the amplitude of the pulse train at input 28a is cancelled by the substantially equal thermal drift in the amplitude of the pulse train at 28b.

In circuits such as translator 28, wherein the average value of the difference between two pulse trains is used as a measure of phase angle, it is desirable to eliminate those differences in the amplitudes of the two pulse trains which are due to device mismatches, thermal mismatches and loading effects. This is because such differences in amplitude do not reflect differences in phase angle. Accordingly, it is desirable that two similar logic devices from the same package drive respective inputs of translator 28, that these devices be connected to no other load and that translator 28 draw substantially equal currents therefrom.

To the end that this may be accomplished, conductors 45b and 45c connect an isolation gate 45 between translator input 28b and the output of countdown circuit 15 and conductors 35b and 35c connect an isolation gate 35 between translator input 28a and comparator output 27c. Since each gate drives only the respective translator input, the amplitudes of the pulse trains at the translator inputs will be substantially equal as long as substantially equal currents are drawn therefrom. The latter condition is established by connecting capacitor 40 and resistors 41 and 42 to input 28b in substantially the same manner in which capacitor 37 and resistors 38 and 39 are connected to input 28a.

The above described amplitude equalization is enhanced by connecting resistors 35a and 45a between the outputs of gates 35 and 45 and a +15 volt supply. This is because the percentage impact of device mismatches is reduced by increasing the high state amplitude of the pulse trains produced by gates 35 and 45.

When the output voltage of inverter 6 is in synchronism with the a-c line voltage, the voltates appearing at translator inputs 28a and 28b have the waveforms shown in FIG. 4a. The average value of the difference between these pulse trains is zero as indicated by the waveform of the voltage at translator output 28c. In the circuit of FIGS. 1 and 2, this zero magnitude signal will neither increase or decrease the operative frequency of inverter 6 and, therefore, will not change the existing synchronous relationship between the inverter output line voltages. It will be understood that the above signal voltage must be measured with respect to the quiescent d-c output voltage of translator 28 which, in the present embodiment, has a value of +15 volts.

Figure 4B:
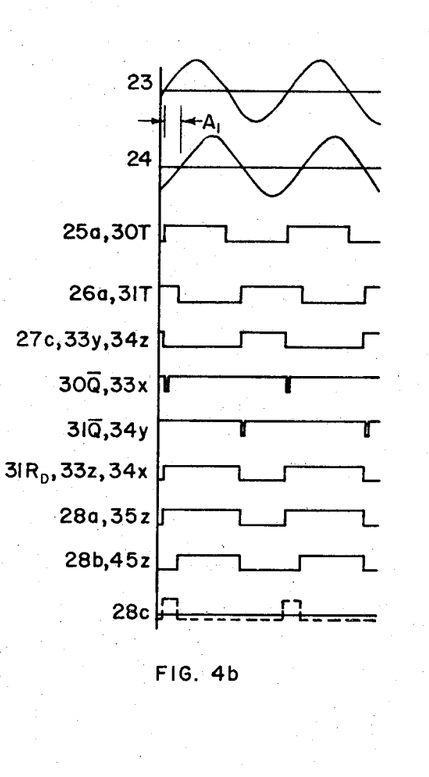

If the output voltage of inverter 6 lags the a-c line voltage, the duty cycle of the pulse train at translator input 28a will be greater than that of the reference pulse train at translator input 28b as shown in FIG. 4b. As a result, the difference between these pulse trains (shown in dotted lines), will have a positive value which, when filtered by amplifier 36, has a positive value shown as a solid line at translator output 28c in FIG. 4b. In the circuit of FIGS. 1 and 2, a signal voltage of this polarity will increase the operative frequency of inverter 6 and thereby reduce the phase angle between the inverter output voltage and the a-c line voltage.

Figure 4C:
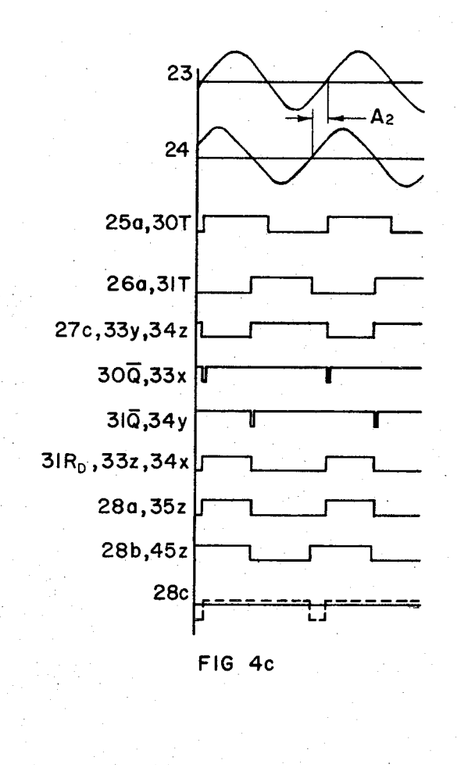

If, on the other hand, the output voltage of inverter 6 leads the a-c line voltage, the duty cycle of the pulse train at translator input 28a will be less than that of the reference pulse train at translator input 28b, as shown in FIG. 4c. Under these conditions, the signal voltage at translator output 28c will have the negative value shown as a solid line in FIG. 4c. In the circuit of FIGS. 1 and 2, a signal voltage of this polarity will decrease the operative frequency of inverter 6 and thereby reduce the phase angle between the inverter output voltage and the a-c line voltage.

From the foregoing, it will be seen that the voltage at translator output 28c deviates from its quiescent value of +15 volts, in accordance with the phase angle between the inverter and line voltages, to reduce the difference between the then existing phase angle between the inverter and the line and the desired phase angle between the inverter and the line. Since, as previously described, two a-c voltages cannot be kept in a fixed phase relationship unless they have the same frequency, it will be seen that the circuitry of the invention controls both phase and frequency.

In the present embodiment, the relationship between signal voltage and phase angle is substantially linear. As a result, the signal voltage at output 28c can be utilized as a direct measure of phase angle. A circuit utilizing this phase measuring property will be discussed later in connection with detector 60 of FIG. 5.

The Integrator

When the inverter voltage is out of phase with the line voltage, it is desirable for the magnitude and sign of the control voltage at the input 19c of pulse generator 19 to be free to change, as required, to eliminate the phase angle therebetween. When, however, the inverter voltage is in phase with the line voltage, it is desirable for the control voltage to remain constant at the value which produce the in-phase condition.

To the end that this may be accomplished, there is provided an integrator network 29. The latter network causes the control voltage at 29b to vary in accordance with the integral with respect to time of the signal voltage which translator 28 applies to integrator input 29a. This is to say that the voltage at integrator output 29b deviates from the quiescent voltage thereat in accordance with the integral with respect to time of the deviation of the translator output voltage from its quiescent value.

In the present embodiment, integrator 29 includes an operational amplifier 48 and a feedback network, including a capacitor 49 and a resistor 50, which causes amplifier 48 to exhibit an integrating characteristic, circuits of this type being well-known to those skilled in the art. Integrator 29 also includes a phase-lead compensating network, including capacitor 51 and a resistor 52, for purposes of stability.

If the phase relationship between the inverter and line voltages is unimportant, integrator 29 may be eliminated and translator output 28c may be connected to input 19c of pulse generator 19 through a suitable coupling network. If this connection is made, the output voltage of inverter 6 will have the same frequency as the a-c line voltage but will be displaced therefrom by a phase angle that is dependent upon line frequency.

In the event that integrator 29 is utilized, circuitry should be provided to keep capacitor 49 discharged during those times when synchronism control circuit 20 interrupts the synchronous relationship between the inverter and line voltages. This is because the failure to discharge capacitor 49 allows integrator 29 to produce a control voltage, during unsynchronized operation, which may delay the re-establishment of synchronized operation. One suitable discharging network, including a field effect transistor 53 having a gate terminal 53g, a source terminal 53s and a drain terminal 53d, a resistor 54 and a gate 55, is shown in FIG. 2. Therein, the interruption of the synchronous relationship between the inverter and the line and the resultant low state voltage on conductor 21a causes the output 55z of gate 55 to go high thus raising the potential of the gate 53g of transistor 53. This increase in the potential of gate 53g causes transistor 53 to conduct between its source-drain terminals 53s and 53d and, thereby, discharge capacitor 49.

If it is desirable for the inverter voltage to bear a phase relationship to the line voltage other than the in-phase relationship described above, such relationship may be established by adjusting a potentiometer 46 which controls the angle that the control circuitry of FIGS. 1 and 2 seeks to establish between the inverter and the line voltages. If, for example, it is desirable that the inverter output voltage continually lags the a-c line voltage by 30°, this relationship may be established by adjusting potentiometer 46 so that the signal voltage appearing at translator output 28c is zero when the inverter lags the line by 30°. An other than in-phase relationship may also be established by varying potentiometer 56 which controls the quiescent output voltage of translator 28 and thereby the voltage with respect to which the signal voltage is measured.

THE SYNCHRONISM CONTROL CIRCUITRY

To the end that the synchronous relationship between the inverter and line voltages may be controlled, as required, to assure a continuous supply of a-c voltage to load 10, there is provided the synchronism control circuit of FIG. 5. The latter includes circuitry for causing inverter 6 to operate in synchronism with the a-c line when the a-c line is within acceptable limits. This assures that load 10 may be transferred smoothly from the inverter to the a-c line if such transfer should become necessary. The synchronism control circuitry of FIG. 5 also includes circuitry for causing inverter 6 to operate independently of the a-c line when the a-c line is not within acceptable limits. This assures that the inverter will supply load 10 with an a-c voltage of a suitable frequency during those times when the a-c line is unacceptable.

In the present embodiment, the circuit of FIG. 5 includes a first detector network 60 for controlling the state of the voltage at output 60b thereof in accordance with the phase angle between the inverter and line voltages. The circuit of FIG. 5 also includes a second detector network 61 for controlling the state of the voltage at output 61e thereof in accordance with whether or not the phase angle between the inverter and line voltages has exceeded ±180° during the last a-c voltage cycle. These detector networks establish the criteria whereby the desirability of synchronizing the inverter and line voltages may be determined. Finally, the circuit of FIG. 5 includes a controller network 63 for initiating or terminating a synchronous relationship between the inverter and the line in accordance with the voltages produced by detectors 60 and 61.

When, for example, controller output 63c is high, controller inputs 63a and 63b are both known to be high, indicating the a-c line is within acceptable limits. Under these conditions, pulse frequency modifying circuit 18 controls the frequency of inverter 6, in accordance with the control voltage produced by integrator 29, to synchronize the inverter and line voltages. When, however, detector network outputs 60b or 61b or both are low, indicating the the a-c line is not within acceptable limits, controller output 63c is low. Under these conditions, pulse frequency modifying circuit 18 is prevented from controlling the frequency of inverter 6 which is then controlled solely by fixed frequency pulse generator 14. Each of the networks of FIG. 5 should be considered in conjunction with those networks which supply line acceptability information thereto. Detector 60 of FIG. 5, for example, operates in conjunction with pulse generators 25 and 26, comparator 27 and translator 28 of FIG. 1 to control the voltage at controller input 63a. Similarly, detector 61 of FIG. 5 operates in conjunction with pulse generators 25 and 26 and comparator 27 of FIG. 1 to control the voltage at controller input 63b. Thus, the circuitry described in connection with FIG. 1 serves as fully in determining whether the inverter should operate in synchronism with the a-c line as it does in producing the control voltage which establishes and maintains that synchronized condition.

FIRST DETECTOR NETWORK 60

In the present embodiment detector 60 is arranged to produce a high at output 60b thereof when the signal voltage at input 60a threof is within a predetermined range of values and to establish a low at output 60b when the signal voltage at input 60a is outside of that range of values. Because detector network input 60a is connected to translator output 28c, the signal voltage appearing at 60a is a direct measure of the phase angle between the inverter and the line voltages. As a result, detector output 60b will be high when the phase angle between the inverter and the line is within predetermined angular limits and will be low when the phase angle is outside those angular limits.

Since, as previously described, pulse frequency modifying circuit 18 is prevented from establishing synchronism between the inverter and the line until detector output 60b goes high, and since detector output 60b is high only when the phase angle is within the above angular limits, it will be seen that the circuitry of FIGS. 1 and 2 is permitted to synchronize the inverter to the a-c line only under circumstances where the transition between non-synchronized and synchronized operation is a smooth one.

To the end that the foregoing may be accomplished, detector 60 includes an absolute value sensor comprising an NPN transistor 65, resistors 66 and 67 (which, in the present embodiment, have substantially the same resistance value) and diodes 68 and 69 for controlling the voltage with respect to ground of a junction 70 in accordance with the absolute value of the signal voltage at detector input 60a. Detector 60 also includes a two-state switching network comprising operational amplifier 71, a feedback resistor 72 and a voltage level adjusting potentiometer 73 for controlling the state of the voltage at point 71c in accordance with the voltage at junction 70.

When the signal voltage at detector input 60a is less than one-half of the 30 volt supply voltage appearing between point 68a and ground, the potential of junction 70 will decrease as the signal voltage at 60a increases. This is because increases in the signal voltage at 60a increase the current flowing in the path including the base-emitter circuit of transistor 65, resistor 67 and ground. Increases in the latter current, in turn, increase the conduction of transistor 65 and thereby increase the voltage drop across resistor 66. As a result, junction 70 will become less positive from ground as the signal voltage increases.

When the signal voltage at detector input 60a is substantially equal to one half of the 30 volt supply voltage, the potential of junction 70 will be substantially equal to one-half of the ±30 volt supply. This is because, under the assumed condition that resistors 66 and 67 have the same resistance, transistor 65 will reach full conduction (saturate) at this value of signal voltage. As a result, the voltage at junction 70 will be determined by the ratio of substantially equal resistors 66 and 67.

When the signal voltage at detector input 60a exceeds one half of the 30 volt supply voltage, the potential of junction 70 will increase as the signal voltage increases. This is because transistor 65, being saturated, has a collector voltage which is substantially equal to its emitter voltage and because increases in the voltage at input 60a will increase the potential of the emitter of transistor 65 by increasing the current in resistor 67. As a result, the voltage at junction 70 will become more positive from ground as the signal voltage increases.

Figure 3C:
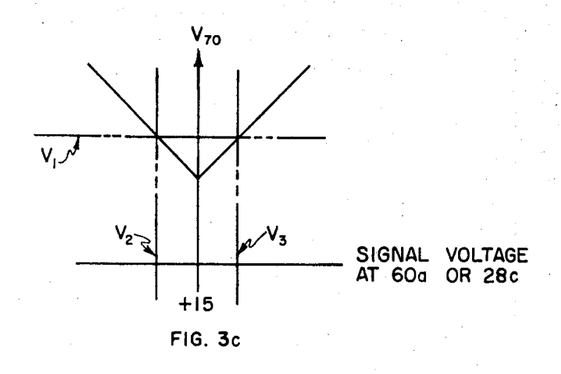

The above described relationship is shown in FIG. 3c wherein the potential of junction 70 is plotted as a function of the signal voltage at detector input 60a. Since, as shown in FIG. 3c, the voltage at junction 70 has the same value for any negative signal voltage as it has for an equal positive signal voltage, it will be seen that the voltage at junction 70 varies in accordance with the absolute value of the signal voltage at detector input 60a.

To the end that the voltage at amplifier output 71c may attain a first predetermined value when the voltage at junction 70 exceeds a preset value and may attain a second predetermined value when the voltage at junction 70 is less than the preset value, non-inverting input 71a of amplifier 71 is connected to junction 70, and inverting input 71b thereof is connected to an adjustable source of d-c voltage here shown as a suitably energized poetntiometer 73. As a result, the voltage at amplifier output 71c will attain a first value in excess of the quiescent voltage thereat when the voltage at input 71a exceeds the preset voltage at input 71b, and will attain a second value less than the quiescent voltage thereat when the voltage at input 71a is less than the preset voltage at input 71b.

The rate at which the amplifier output voltage switches from one to the other of the above two states is increased by resistor 72 which introduces positive feedback between the amplifier output and input. As a result of this feedback, amplifier 71 acts as a two-state device the state of which is determined by the voltage at input 71a.

As described previously, the voltage at junction 70 increases as the signal voltage departs from +15 volts in either direction. As a result, for any preset voltage at amplifier input 71b, the voltage at junction 70 will be less than that preset value only when the signal voltage is within a range of voltages centered about +15 volts. If, for example, the voltage at junction 70 is greater than the voltage VI of FIG. 3c, the signal voltage is not within the window or range of voltages defined by voltages V2 and V3. If, on the other hand, the voltage at junction 70 is less than the voltage V1, the signal voltage is within the window or range of voltages defined by voltages V2 and V3. Thus, amplifier output 71c will be low only when the signal voltage is within a preset range of signal voltage values. The width of this range may be varied by adjusting potentiometer 73 and, thereby, the voltage VI of FIG. 3c.

Because, as previously described, the signal voltage is a function of the phase angle between the inverter and line voltages, the state of the voltage at amplifier output 71c indicates whether the phase angle is or is not within known angular limits. If, for example, amplifier output 71c is low, the signal voltage is known to be within the range of voltages defined by the voltages V2 and V3 of FIG. 3c. As shown in FIG. 3b, the phase angle between the inverter and line voltages is between angular limits P1 and P2 when the signal voltage is between voltages V2 and V3. As a result, a low at amplifier output 71c indicates that the phase angle between the inverter and the line voltages is between angular limits P1 and P2 of FIG. 3b. Similarly, a high state voltage at amplifier output 71c indicates that the phase angle between the inverter and line voltages is not within angular limits P1 and P2.

To the end that the voltages at amplifier output 71c may be converted to two-state voltages suitable for utilization by controller 63, there is provided a voltage level shifting network including transistors 74 and 75, current limiting resistors 76 and 77, a voltage divider including resistors 78 and 79 and a base-emitter bypass diode 80. When amplifier output 71c is low, current flows from the +15 volt supply through the base-emitter circuit of transistor 74, and resistor 76 to ground through amplifier 71. Under these conditions, transistor 74 conducts a current from the +15 volt supply, through the collector-emitter path of transistor 74 and resistors 78 and 79 to ground. The voltage which the latter current establishes across resistor 79, in turn, causes base-emitter current to flow through transistor 75 to ground. This current causes transistor 75 to conduct a current from the +5 volt supply through resistor 77 to ground. Because transistor 75 is conducting, the collector-emitter voltage drop thereacross is low causing ground potential to appear at the inputs 81x and 81y of a gate 81 through a conductor 82. Under these conditions, sensing network output 60b which is connected to gate output 81z will be in its high state.

Similarly, when the voltage at amplifier output 71c is high, current flows from amplifier 71 through resistor 76 and diode 80 to the +15 volt supply to turn off transistors 74 and 75. Because transistor 75 is off, negligible voltage appears across resistor 77. As a result, the potential of conductor 82 rises to that of the +5 volt supply. Under these conditions, gate inputs 81x and 81y are high causing gate output 81z and detector output 60b to be low. Thus, detector output 60b is high when the phase angle between the inverter and the line voltages is within the window defined by angular limits P1 and P2 of FIG. 3b and is low when the phase angle between the inverter and the line is outside that window.

Second Detector Network 61

If the phase angle between the inverter and the line exceeds ±180°, it is desirable that the synchronous relationship between the inverter and line voltages be terminated. That is because a phase angle in excess of ±180° is an indication that the frequency of the a-c line voltage has deviated out of acceptable frequency limits during the last a-c voltage cycle. To accomplish the above termination there is provided detector 61 which produces a low state voltage at output 61e thereof when the phase angle between the inverter and the line exceeds ±180°. It will be understood that if the a-c line frequency drops to zero as, for example, during a power failure, or if a substantial noise spike causes an instantaneous reversal in one of the a-c voltages, this will be detected by detector network 61 in the same manner as any other unacceptable line frequency condition.

In the present embodiment, detector 61 is arranged to detect unacceptable line frequency conditions by detecting a change in the order of occurrence of the zero crossings of the inverter and line voltages. This is accomplished by detecting changes in the order of occurrence of the transitions of the pulse trains which comparator inputs 27a and 27b apply to detector network inputs 61b and 61d. If, for example, successive low-to-high transitions in the voltage at detector input 61b are each separated in time by a low-to-high transition in the voltage at detector input 61d, and if successive low-to-high transitions in the voltage at detector input 61d are each separated by a low-to-high transition in the voltage at detector input 61b, detector output 61e will remain high indicating that there has been no change in the order of occurrence of the transitions at inputs 61b and 61d and, consequently, that the phase angle between the inverter and line voltages has not exceeded ±180° during the last a-c voltage cycle.

If, however, there should occur two successive low-to-high transitions at detector input 61b without an intervening low-to-high transition at detector input 61d, or if there should occur two successive low-to-high transitions at detector input 61d without an intervening low-to-high transition at detector input 61b, detector output 61e will go low indicating that there has been a change in the order of occurrence of the transistions at inputs 61b and 61d and, consequently, that the phase angle between the inverter and the line has exceeded ±180°.

To the end that this may be accomplished, the inputs 61a, 61b, 61c and 61d of detector 61 are connected to comparator terminals 27c, 27a, 27d and 27b, respectively. Detector inputs 61a and 61b comprise a first pair of companion inputs which work together in controlling the state of detector output 61e. Detector inputs 61c and 61d comprise a second pair of companion inputs which also work together in controlling the state of detector output 61e.

Figure 6A:
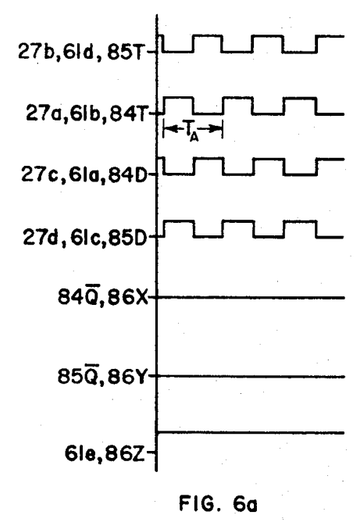
Figure 6B:
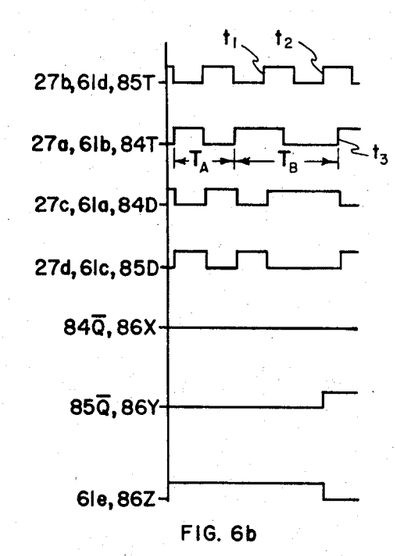
Figure 6C:
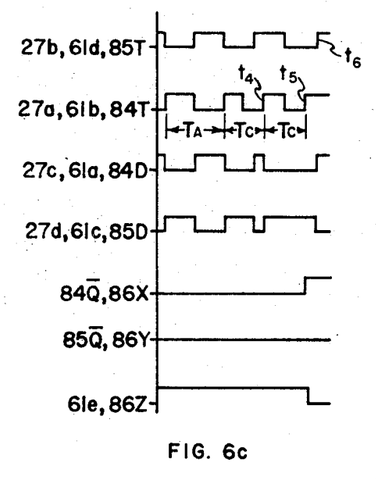

The voltages which appear at various points within detector 61 are shown in FIGS. 6a, 6b and 6c. Referring to FIG. 6a, which illustrates the voltages within detector 61 when the inverter and the line voltages are in synchronism, it will be seen that each low-to-high transition at 61d occurs halfway between successive low-to-high transitions at 61b and that each low-to-high transition at 61b occurs between successive low-to-high transitions at 61d. Under these conditions, detector output 61e remains in its normal or high state, as previously described. Because the low-to-high transitions appearing at input 61b are each 180° away from the nearest low-to-high transitions appearing at input 61d, the pulse train at 61b may be shifted up to 180° to the right or left of the pulse train at 61d without changing the order of occurrence of the transitions of the two pulse trains. Thus, detector 61 will indicate no change in the transition order so long as the phase angle between the inverter and line voltages is less than ±180°.

In FIG. 6b, which illustrates the voltages within detector 61 when the period of the a-c line voltage increases suddenly from $T_A$ to $T_B$, it will be seen that low-to-high transitions $t_1$ and $t_2$ of the pulse train at 61d occur without an intervening low-to-high transition in the pulse train at 61b. This is because the increase in the period of the pulse train at 61b causes transition $t_3$ to occur after instead of before transition $t_2$. It will be understood that double transition $t_1-t_2$ can result not only from an accumulation of 180° of phase angle during a single cycle, as shown in FIG. 6b, but also from the accumulation of 180° of phase angle over several cycles.

In FIG. 6c, which illustrates the voltages within detector 61 when the period of the a-c line voltage decreases suddenly from $T_A$ to $T_C$, it will be seen that low-to-high transitions $t_4$ and $t_5$ of the pulse train at 61b occur without an intervening low-to-high transition in the pulse train at 61d. This is because the decrease in the period of the pulse train at 61d causes transition $t_5$ to occur before instead of after transition $t_6$. Thus, the occurrence of two consecutive low-to-high transitions in the pulse train at 61b indicates that the period of the a-c line voltage has been less than the period of the inverter voltage for a time sufficient to accumulate ±180°.

In controlling the synchronous relationship between the inverter and the line, detector network 61 will drive detector output 61e low each time there occurs a double transition at 61b as well as each time there occurs a double transition at 61d, each of these conditions indicating that the period (and, therefore, the frequency) of one of the a-c voltages is not within accpetable limits.

The operation of detector 61 will now be described. Referring to the pulse train appearing at input 61c in FIG. 6a, it will be seen that the voltage at detector input 61c is high during each low-to-high transition of the voltage at companion input 61d. This is because detector inputs 61c and 61d are connected to comparator terminals 27d and 27b, respectively, and because high-to-low transitions at 27d are initiated by low-to-high transitions at 27b. Since the input 85D of a flip-flop 85 is connected to detector input 61c and since flip-flop input 85T is connected to the companion input 61d, flip-flop input 85D is high each time there occurs a low-to-high transition at flip-flop input 85T. As a result, flip-flop 85 remains in its set state. Similarly, a flip-flop 84 remains in its set state because flip-flop input 84D is high each time that a low-to-high transition occurs at flip-flop input 84T. Since, under these conditions, flip-flop outputs 84Q and 85Q apply continuous low state voltages to gate inputs 86x and 86y, gate output 86z and detector output 61e will remain high. This indicates that the phase angle between the inverter and the line is less than ±180°.

Under the conditions shown in FIG. 6b, however, low-to-high transition $t_2$ appears at flip-flop input 85T at a time when a low appears at flip-flop input 85D. As a result, flip-flop 85 resets and renders high gate input 86y. When this occurs, gate output 86z and detector output 61e will go low indicating the occurrence of a double transition.

Similarly, under the conditions shown in FIG. 6c, low-to-high transition $t_5$ appears at flip-flop input 84T at a time when a low appears at flip-flop input 84D. As a result, flip-flop 84 resets and renders high gate input 86x. When this occurs, gate output 86z and detector output 61e will go low indicating the occurrence of a double transition. Thus, detector output 61e goes low when a double transition occurs at input 61d as well as when a double transition occurs at input 61b.

Thus, detector 61 includes a first detector switching network, including a flip-flop 84 and a gate 86, for rendering low detector output 61e when comparator output 27c is low at the time when a low-to-high transition appears at comparator input 27a and for rendering high detector output 61e when comparator output 27c is high at the time when a low-to-high transition appears at comparator input 27a. Detector 61 also includes a second detector switching network, including flip-flip 85 and gate 86, for rendering low detector output 61e when comparator output 27d (the complement of output 27c generated by gate 57) is low at the time when a low-to-high transition appears at comparator input 27b and for rendering high detector output 61e when comparator output 27d is high at the time when a low-to-high transition occurs at comparator input 27b.

While detectors 60 and 61 both detect circuit conditions wherein the phase angle between the inverter and line voltages exceeds predetermined limits, each detector has properties which make it more effective in detecting particular kinds of fault conditions than the other. Detector 60, for example, will detect significant line frequency variations which may never become large enough to be detected by detector 61. Detector 61, on the other hand, will detect large line frequency variations or a-c line failure within a shorter time than detector 60. Thus, the fault detecting activity of detector 60 supplements the fault detecting activity of detector 61 and vice-versa.

The Controller

To the end that the occurrence of an abnormal line frequency condition, as manifested by the appearance of a low at detector output 60b or detector 61e or both, will terminate an existing synchronous relationship between the inverter and the line, and to the end that the restoration of detector outputs 60b and 61e to their normal or high states will result in the restoration of a synchronous relationship between the inverter and line voltages, there is provided the controller network 63 of FIG. 5. In the present embodiment, controller 63 includes gates 88, 89, 90 and 91 and a time delay network which includes a unijunction transistor 92 having upper and lower base resistors 93 and 94, a resistor 95 and a capacitor 96.

When the phase angle between the inverter and the line is within acceptable limits, detectors 60 and 61 apply high state voltages to controller inputs 63a and 63b through conductors 87a and 87b, respectively. If, under these conditions, controller 63 determines that the a-c line frequency is within predetermined limits, controller output 63c will assume its high state, this high being applied to pulse frequency modifying circuit 18 through a conductor 21 to cause inverter 6 to operate in synchronism with the a-c line voltage. When, however, the a-c line is not suitable for energizing load 10, detectors 60 or 61 or both will apply low state voltages to controller 63. Under these conditions, controller output 63c will assume its low state, this low being applied to pulse frequency modifying network 18 through conductor 21 to cause inverter 6 to operate without regard to the frequency of the a-c line voltage.

In order that controller 63 may prevent inverter 6 from operating in synchronism with the a-c line when the a-c line frequency is outside of predetermined frequency limits, low-to-high transitions at controller inputs 63a and 63b are prevented from initiating a low-to-high transition at controller output 63c until there has elapsed a predetermined time during which the phase angle between the inverter and line voltages remains within known limits. Since rate at which the phase angle between the line and the inverter accumulates is proportional to the difference between the line frequency and the inverter frequency (the inverter frequency being determined by fixed frequency pulse generator 14 because inverter 6 is at this time operating in its non-synchronized mode), the requirement that the phase angle remains less than a known value for a known time is equivalent to requiring that the a-c line frequency is within a known range of frequencies centered about the fixed inverter frequency. It will be understood that the high-to-low transition of controller output 63c is not delayed in the manner described above, it being desirable to protect a-c load 10 from an unacceptable a-c line as soon as the unacceptability thereof is determined.

Figure 7:
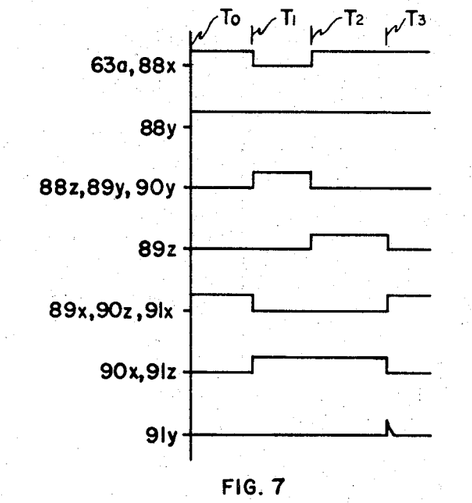

The operation of controller 63 will now be described. Assuming that controller output 63c is high, that is, assuming that controller inputs 63a and 63b are both high, the states of the inputs and outputs of the gates included therein will be as shown at time $T_o$ in FIG. 7. Assuming further that detector 60 detects an unacceptable line frequency condition at time T1, detector 60 will apply a low to controller input 63a and gate input 88x at that time. This low will cause gate output 88z to go high and render high gate input 90y through a conductor 99. Since gate input 90x is already low because it is connected to gate output 91z through a conductor 100, the high which gate 88 applies to gate input 90y will cause gate output 90z to go low causing controller output 63c and gate input 91x to go low. Under these conditions, inverter 6 will operate without regard to the frequency of the a-c line, as previously described.

In addition, the low which gate output 90z applies to gate input 91x, together with the low appearing at gate input 91y, will cause gate output 91z to go high. Since the high at gate output 91z is, in turn, applied to gate input 90x through conductor 100, gate output 90z and controller output 63c are locked into their low states.

Later, when the frequency of the a-c line is restored to a suitable value, detector output 60b will return to its high state to render high controller input 63a and gate input 88x. Under these conditions, gate output 88z will return to its low state to render low gate input 89y and gate input 90y. Because, as previously described, gate output 91z holds gate input 90x high, the low which gate 88 applies to gate input 90y will not change the state of gate 90. As a result, controller output 63c will remain low and thereby continue to prevent inverter 6 from operating in synchronism with the a-c line. Controller output 63c will remain in this low condition until detector outputs 60b and 61e have remained high for a time sufficient for capacitor 96 to charge through resistor 95 and fire transistor 92.

As described above, the return of detector output 60b to its normally high state causes gate output 88z to go low. This low, together with the low which gate 90 applies to gate input 89x through a conductor 101, causes gate output 89z to go high. The latter high diverts the current which had been flowing from the +30 volt supply through resistor 95, a resistor 97 and diode 98 to ground through gate 89 and causes this current to flow from the +30 volt supply through resistor 95 and capacitor 96 to ground to charge capacitor 96.

When capacitor 96 charges to a voltage sufficient to fire unijunction transistor 92, capacitor 96 will discharge through the emitter-lower base circuit of transistor 92 and resistor 94 through ground. The voltage which is developed across resistor 94 by this discharge is applied as a high to gate input 91y through a conductor 102. As gate input 91y goes high, gate output 91z will go low and thereby render low gate input 90x through conductor 100. Because gate input 90y has already been rendered low by gate 88, gate 90 will at this time change state, and render high controller output 63c. Under these conditions inverter 6 will begin to operate in synchronism with the a-c line.

Since the high which gate 90 applies to controller output 63c also appears at gate input 91x and at gate input 89x, gates 89 and 91 are restored to their original states. Thus, the controller circuitry will be in condition for suppressing the synchronous relationship between the inverter and the line if and when detector outputs 60b or 61e or both go low once again.

From the foregoing, it will be seen that controller output 63c will go low at substantially the same time as controller input 63a or 63b or both go low, but will go high only after both controller inputs 63a and 63b have gone high and remained high for a time determined by the time delay network including unijunction transistor 92. This characteristic assures that the inverter does not synchronize to the line, after line failure, until after the elapse of a time sufficient to indicate that the a-c line has been within acceptable frequency limits for more than just an instant and thus, that the a-c line will probably remain within accpetable frequency limits.

Figure 8:
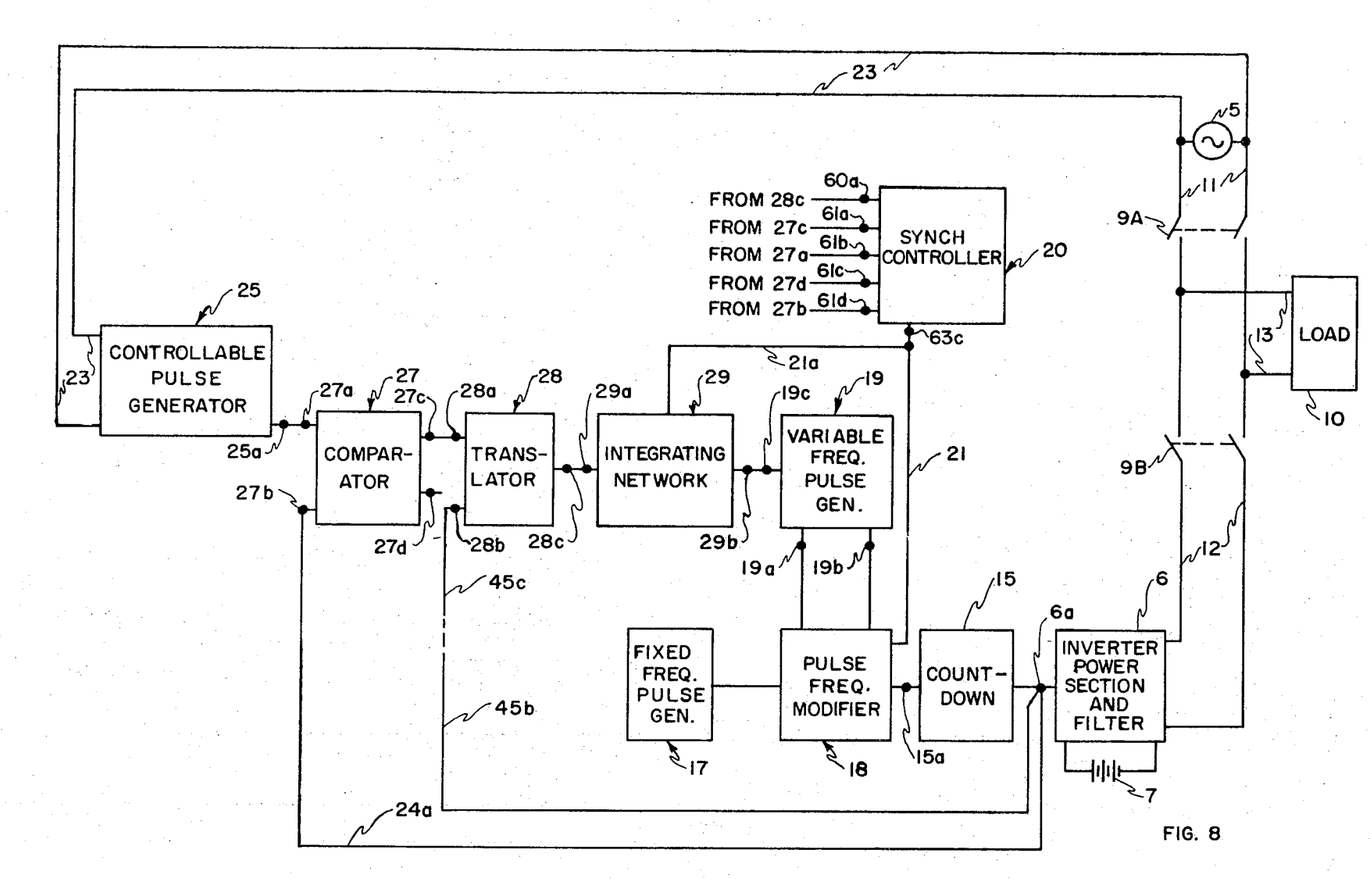
FIG. 8 is a block diagram of a modified circuit embodying the invention.

If it is desirable for inverter 6 to operate in parallel with a-c source 5, this may be accomplished by connecting the circuit of the invention as shown in FIG. 8 and by connecting a-c conductor pairs 11 and 12 to load 10 through suitable paralleling devices indicated symbolically by switches 9A and 9B. In the circuit of FIG. 8, a sensing lead 24a connects comparator input 27b in sensing relationship to pulse train appearing at the switching control input 6a of inverter 6. Connecting conductor 24a in this manner allows the commutation events within inverter 6 to be maintained in a predetermined phase relationship to the a-c line voltage, the latter being a condition necessary for the parallel operation of a-c sources 5 and 6.

If a sensing arrangement of the type shown in FIG. 8 is utilized, controllable pulse generator 26 may be eliminated. This is because the voltage at inverter input 6a has a pulse train waveform, as previously described, and, as a result, the wave-shaping provided by generator 26 is unnecessary.

In view of the foregoing, it will be seen that a circuit constructed in accordance with the invention is adapted to generate a signal voltage having an average value and sign which vary in accordance with the phase angle between two a-c voltages and is adapted to control the utilization of this signal voltage to establish or to terminate a synchronous relationship between two a-c sources in accordance with the requirements of a protected load.

It will be understood that the embodiments shown herein are for illustrative purposes only and may be changed or modified without departing from the spirit and scope of the appended claims.

What is claimed is:

1. In a synchronism control circuit suitable for initiating and terminating the operation of two a-c sources in a synchronized mode, in combination, a first switching network having two inputs and an output, said first switching network comprising means for establishing a first value of voltage at the output thereof when the phase angle between the voltages appearing at the inputs thereof is within preset limits and for establishing a second value of voltage at the output thereof when the phase angle between the voltages appearing at the inputs thereof is outside said preset limits, means for connecting said two a-c sources to respective inputs of said first switching network, a second switching network having two inputs and an output, said second switching network comprising means for establishing a first value of voltage at the output thereof when successive transitions in the voltage at each input thereof are each separated by a predetermined intervening transition in the voltage at the other input thereof and for establishing a second value of voltage at the output thereof when successive transitions in the voltage at each input thereof are not separated by a predetermined intervening transition in the voltage at the other input thereof, means for connecting said two a-c sources to respective inputs of said second switching network, controller means for generating a first synchronism control signal when the voltage at the output of at least one of said switching networks assumes said second value and for generating a second synchronism control signal after both of said switching networks assume said first value, and means for connecting the outputs of said switching networks to the inputs of said controller means.

2. A synchronism control circuit as set forth in claim 1 in which said controller means delays the generation of said second synchronism control signal for a predetermined time after said first voltage appears at both inputs of said controller means.

3. In a circuit for controlling the phase relationship between two a-c sources, in combination, first and second controllable pulse generating means each having input means and output means, means for connecting the input means of said controllable pulse generating means to said respective a-c sources, comparing means for providing a pulse train having a duty cycle which varies in accordance with the phase angle between the voltages at the output means of said controllable pulse generating means, said comparing means having first and second input means and having output means, means for connecting the output means of said first and second controllable pulse generating means to respective input means of said comparing means, translator means having input means and output means, said translator means comprising means for generating a signal voltage which varies in accordance with the duty cycle of the voltage at the output means of said comparing means, means for connecting the output means of said comparing means to the input means of said translator means, integrator means having input means and output means, said integrator means comprising means for generating a voltage at the output means thereof which varies in accordance with the time integral of the voltage applied to the input means thereof, means for connecting the output means of said translator means to the input means of said integrator means, means for connecting the output means of said integrator means in frequency controlling relationship to one of said a-c sources, first detector means having input means and output means, said first detector means comprising means for establishing a first output state at the output means thereof when the voltage at the input means thereof is within predetermined limits and for establishing a second output state at the output means thereof when the voltage at the input means thereof is outside of said predetermined limits, means for connecting the output means of said translator means to the input means of said first detector means, second detector means having a plurality of input means and having output means, said second detector means comprising means for establishing a first output state at the output means thereof when successive transitions at each of the input means of said comparing means are each separated by a predetermined intervening transition at the other input means of said comparing means and for establishing a second output state at the output means thereof when successive transitions at each of the input means of said comparing means are not separated by a predetermined intervening transition at the other input means of said comparing means, means for connecting predetermined ones of the input means of said second detector means to the input means of said comparing means, means for connecting other input means of said second detector means to the output means of said comparing means, and controlling means connected to said first and second detector means for generating a first synchronism control signal when the output means of at least one of said first and second detector means is in its second state and for generating a second synchronism control signal after the voltages at the output means of said first and second detector means assume their first states.

* * * * *